United States Patent
Huo et al.

(10) Patent No.: US 12,368,628 B2
(45) Date of Patent: Jul. 22, 2025

(54) METHOD FOR OBTAINING INFORMATION ABOUT A CHANNEL AND APPARATUS

(71) Applicant: HUAWEI TECHNOLOGIES CO., LTD., Guangdong (CN)

(72) Inventors: Qiang Huo, Moscow (RU); Zhi Yang, Shenzhen (CN); Xi Chen, Madrid (ES); Chunhui Le, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 20 days.

(21) Appl. No.: 18/495,994

(22) Filed: Oct. 27, 2023

(65) Prior Publication Data

US 2024/0073080 A1     Feb. 29, 2024

Related U.S. Application Data

(63) Continuation of application No. PCT/CN2022/086048, filed on Apr. 11, 2022.

(30) Foreign Application Priority Data

Apr. 30, 2021   (CN) .......................... 202110485014.7

(51) Int. Cl.
    *H04L 27/32*         (2006.01)
(52) U.S. Cl.
    CPC .................................. *H04L 27/32* (2013.01)
(58) Field of Classification Search
    CPC .......... H04B 1/10; H04B 1/12; H04B 7/0456; H04B 17/00; H04B 17/10; H04B 17/27; H04B 17/345; H04L 27/00; H04L 27/32; H04W 24/02; H04W 24/06; H04W 24/08; H04W 52/24; H04W 64/00
    USPC ...... 324/76.39, 520; 370/242, 252; 375/219, 375/260, 262, 267, 295, 316; 455/73, 455/562.1
See application file for complete search history.

(56) References Cited

U.S. PATENT DOCUMENTS

| | | | | |
|---|---|---|---|---|
| 10,334,460 | B2 * | 6/2019 | Beck | H04W 24/06 |
| 11,362,693 | B2 * | 6/2022 | Abdelmonem | H04B 17/336 |
| 12,040,843 | B2 * | 7/2024 | Wyville | H04B 17/103 |
| 2020/0382188 | A1 | 12/2020 | Stephenne et al. | |

OTHER PUBLICATIONS

Extended European Search Report issued in EP22794565.6, dated Sep. 9, 2024, 10 pages.

* cited by examiner

*Primary Examiner* — Shawkat M Ali

(57) ABSTRACT

A method for obtaining information about a channel and a related apparatus are disclosed. The method includes: obtaining first feedback signals from a passive inter-modulation source; obtaining first update direction information based on the first feedback signals; and obtaining information about a channel with the passive inter-modulation source based on the first update direction information. According to the method and the apparatus, complexity of obtaining the information about the channel with the passive inter-modulation source can be reduced, time and power consumption required for obtaining the information about the channel can be reduced, and accuracy of the information about the channel can be improved.

20 Claims, 6 Drawing Sheets

METHOD FOR OBTAINING INFORMATION ABOUT A CHANNEL AND APPARATUS

CROSS-REFERENCE TO RELATED APPLICATIONS

This application 1 is a continuation of International Application No. PCT/CN2022/086048, filed on Apr. 11, 2022, which claims priority to Chinese Patent Application No. 202110485014.7, filed on Apr. 30, 2021. The disclosures of the aforementioned applications are hereby incorporated by reference in their entireties.

TECHNICAL FIELD

The present disclosure relates to the field of communication technologies, and in particular, to a method for obtaining information about a channel between a transmit antenna and a passive inter-modulation source.

BACKGROUND

A nonlinear interference source is an important factor that limits a capacity of a communication system. Typical nonlinear interference includes passive inter-modulation (PIM) interference and the like. Passive inter-modulation in a wireless communication system may refer to, for example, an inter-modulation effect caused by nonlinearity of a passive component when the passive component such as a connector, a feeder, an antenna, or a filter works in a condition of high-power signals of a plurality of frequencies. A passive inter-modulation signal of a new frequency is generated through the passive inter-modulation. When the frequency of the passive inter-modulation signal falls within a receive frequency range of a receive antenna and a power of the inter-modulation signal reaches a specific value, interference on the communication system is caused. When generating new frequency components, inter-modulation also leads to widening of a signal spectrum. For wideband signals, if inter-modulation performance of the system deteriorates, the entire receive band rather than only a single frequency is interfered after the inter-modulation occurs.

The passive inter-modulation is mainly caused by material nonlinearity and contact nonlinearity. During design and manufacturing of a component, inter-modulation caused by the material nonlinearity may be avoided by avoiding using a nonlinear material. The contact nonlinearity is difficult to avoid. Most inter-modulation is caused by the contact nonlinearity. A connector is an important source of inter-modulation. How to accurately obtain information about a channel between a transmit antenna and a passive inter-modulation source is an urgent problem to be resolved.

SUMMARY

Embodiments of the present disclosure provide a method for obtaining information about a channel and an apparatus, where update direction information is obtained by using a feedback signal from a passive inter-modulation source, and information about a channel with the passive inter-modulation source is obtained based on the update direction information. According to the method, complexity of obtaining the information about the channel is reduced, and accuracy of the obtained information about the channel is improved.

According to a first aspect, a method for obtaining information about a channel is provided. The method may be performed by a network device or a module of a network device, or may be performed by a terminal or a module of a terminal, or may be implemented by software that can implement all or some functions of a network device. The method includes: obtaining N+1 first feedback signals $Y_n$ from a passive inter-modulation source, where n=0 . . . N, N is related to a quantity $N_x$ of transmit antennas or is any positive integer, and $N_x$ is a positive integer; obtaining first update direction information p based on the N+1 first feedback signals $Y_n$, where the first update direction information p is a vector whose dimension is related to $N_x$; and obtaining information about a channel with the passive inter-modulation source based on the first update direction information p, where the information about the channel is used to set a beam weight. The quantity $N_x$ of transmit antennas is a quantity of transmit antennas of an execution body. For example, if the execution body is the network device or the module of the network device, the quantity of transmit antennas is a quantity of transmit antennas of the network device. If the execution body is the terminal or the module of the terminal, the quantity of transmit antennas is a quantity of transmit antennas of the terminal. When N is related to $N_x$, it may also be understood that the first update direction information p is a vector whose dimension is related to N.

According to the foregoing method, the information about the channel can be obtained by using a feedback signal, thereby improving accuracy of the obtained information about the channel and reducing complexity of obtaining the information about the channel.

With reference to the first aspect, in some implementations of the first aspect, the method includes: outputting N+1 first sounding signals $X_n$, where the first sounding signal $X_n$ is related to a first weight $v_n$, and the first weight $v_n$ is a vector whose dimension is related to $N_x$; and the N+1 first feedback signals $Y_n$ are excited by the N+1 first sounding signals $X_n$. When N is related to $N_x$, it may also be understood that the first weight $v_n$ is a vector whose dimension is related to N.

In the foregoing implementation, the first sounding signal $X_n$ may be obtained by setting the first weight $v_n$, and the first feedback signal $Y_n$ is excited, so that the first update direction information p is obtained by using the first feedback signal $Y_n$, thereby reducing complexity of obtaining the information about the channel, reducing calculation time, and reducing calculation overheads and power consumption.

With reference to the first aspect, in some implementations of the first aspect, the obtaining first update direction information p based on the first feedback signals $Y_n$ includes: obtaining the first update direction information p based on one or more of the following attributes of the first feedback signal $Y_n$: a power of the signal; a sum of amplitudes of the signal; an average value of amplitudes of the signal; or a sum of some or all feature values of a covariance matrix of the signal.

In the foregoing implementation, the first update direction information p may be obtained by using the attribute of the first feedback signal $Y_n$, so as to obtain the information about the channel.

With reference to the first aspect, in some implementations of the first aspect, the method includes: obtaining S second feedback signals $B_s$ from the passive inter-modulation source, where s=1 . . . S, and S is an integer greater than 0; and obtaining first optimization step information $\rho_{opt}$ based on the S second feedback signals $B_s$; and the obtaining information about a channel with the passive inter-modulation source based on the first update direction information p includes: obtaining the information about the channel with the passive inter-modulation source based on the first update direction information p and the first optimization step information $\rho_{opt}$.

In the foregoing implementation, the first optimization step information $\rho_{opt}$ is obtained by using the second feedback signal $B_s$, so that impact of the first update direction information p on obtaining the information about the channel can be optimized, and accuracy of the obtained information about the channel is improved.

With reference to the first aspect, in some implementations of the first aspect, the method includes: outputting S second sounding signals $A_s$, where the second sounding signal $A_s$ is generated based on the first update direction information p and a first step value $\rho_s$ corresponding to the second sounding signal $A_s$, and $\rho_s$ is a real number or a complex number, where the S second feedback signals $B_s$ are excited by the S second sounding signals $A_s$.

In the foregoing implementation, the second sounding signals $A_s$ may be output based on the first update direction information p and different step values, and the second feedback signals $B_s$ may be excited.

With reference to the first aspect, in some implementations of the first aspect, the obtaining first optimization step information $\rho_{opt}$ based on the S second feedback signals $B_s$ includes: obtaining the first optimization step information $\rho_{opt}$ based on one or more of the following attributes of the second feedback signal $B_s$: a power of the signal; a sum of amplitudes of the signal; an average value of amplitudes of the signal; or a sum of some or all feature values of a covariance matrix of the signal.

In the foregoing implementation, the first optimization step information $\rho_{opt}$ may be obtained by using the attribute of the second feedback signal $B_s$.

With reference to the first aspect, in some implementations of the first aspect, the method includes: when a first condition is not met or a second condition is met, obtaining M+1 third feedback signals $\hat{Y}_m$ from the passive inter-modulation source, where m=0 . . . M, and M is related to $N_x$ or is any positive integer; and obtaining second update direction information p based on the M+1 third feedback signals $\hat{Y}_m$, where the second update direction information p is a vector whose dimension is related to $N_x$. If M is related to $N_x$, it may also be understood that the second update direction information $\tilde{p}$ is a vector whose dimension is related to M.

According to the method in the foregoing implementations, iterative calculation may be performed on the update direction information, thereby improving accuracy of the update direction information and improving accuracy of the obtained information about the channel.

With reference to the first aspect, in some implementations of the first aspect, the method includes: outputting M+1 third sounding signals $\tilde{X}_m$, where the third sounding signal $\tilde{X}_m$ is related to a second weight $\tilde{v}_m$, the second weight Um is related to the first update direction information p, and the second weight $\tilde{v}_m$ is a vector whose dimension is related to $N_x$, where the M+1 third feedback signals $\hat{Y}_m$ are excited by the M+1 third sounding signals $\tilde{X}_m$. If M is related to $N_x$, it may also be understood that the second weight $\tilde{v}_m$ is a vector whose dimension is related to M.

According to the method in the foregoing implementations, the third sounding signal $\tilde{X}_m$ may be obtained by setting the second weight $\tilde{v}_m$, and the third feedback signal $\tilde{Y}_m$ is excited, so that the second update direction information $\tilde{p}$ is obtained by using the third feedback signal $\hat{Y}_m$n, thereby reducing complexity of obtaining the information about the channel, reducing calculation time, and reducing calculation overheads and power consumption.

With reference to the first aspect, in some implementations of the first aspect, the obtaining second update direction information $\tilde{p}$ based on the third feedback signals $\tilde{Y}_m$ includes: obtaining the second update direction information $\tilde{p}$ based on one or more of the following attributes of the third feedback signal $\tilde{Y}_m$: a power of the signal; a sum of amplitudes of the signal; an average value of amplitudes of the signal; or a sum of some or all feature values of a covariance matrix of the signal.

In the foregoing implementation, the second update direction information $\tilde{p}$ may be obtained by using the attribute of the third feedback signal $\tilde{Y}_m$, so as to obtain the information about the channel.

With reference to the first aspect, in some implementations of the first aspect, the method includes: when a first condition is met or a second condition is not met, obtaining the information about the channel with the passive inter-modulation source based on the first update direction information p. The first update direction information p may be the first update direction information p obtained for the first time, or the second update direction information $\tilde{p}$ obtained in an iteration process may be used as the first update direction information p, to obtain the information about the channel.

According to the foregoing method, when an iteration condition is met, the information about the channel may be obtained by using the obtained first update direction information p, thereby improving accuracy of the information about the channel.

With reference to the first aspect, in some implementations of the first aspect, the method includes: obtaining K fourth feedback signals $\tilde{B}_k$ from the passive inter-modulation source, where k=1 . . . K, and K is an integer greater than 0; and obtaining second optimization step information $\tilde{\rho}_{opt}$ based on the K fourth feedback signals $\tilde{B}_k$, where the second optimization step information $\tilde{\rho}_{opt}$ is used to obtain the information about the channel with the passive inter-modulation source.

According to the foregoing method, the second optimization step information $\tilde{\rho}_{opt}$ is obtained by using the fourth feedback signal $\tilde{B}_k$, so that accuracy of the second optimization step information $\tilde{\rho}_{opt}$ can be improved through iteration, thereby optimizing impact of the update direction information on obtaining the information about the channel, and improving accuracy of the obtained information about the channel.

With reference to the first aspect, in some implementations of the first aspect, the method includes: outputting K fourth sounding signals $\tilde{A}_k$, where the fourth sounding signal $\tilde{A}_k$ is generated based on the second update direction information $\tilde{p}$ and a second step value $\tilde{\rho}_k$ corresponding to the fourth sounding signal $\tilde{A}k$, and the second step value $\tilde{\rho}_k$ is a real number or a complex number, where the K fourth feedback signals $\tilde{B}_k$ are excited by the K fourth sounding signals $\tilde{A}k$.

In the foregoing implementation, the fourth sounding signals $\tilde{A}k$ may be output based on the second update direction information $\tilde{p}$ and different step values, and the fourth feedback signals $\tilde{B}_k$ may be excited.

With reference to the first aspect, in some implementations of the first aspect, the obtaining second optimization step information $\tilde{\rho}_{opt}$ based on the K fourth feedback signals $\tilde{B}_k$ includes: obtaining the second optimization step information $\tilde{\rho}_{opt}$ based on one or more of the following attributes of $\tilde{B}_k$: a power of the signal; a sum of amplitudes of the signal; an average value of amplitudes of the signal; or a sum of some or all feature values of a covariance matrix of the signal.

In the foregoing implementation, the second optimization step information $\tilde{\rho}_{opt}$ may be obtained by using the attribute of the fourth feedback signal $\tilde{B}_k$.

With reference to the first aspect, in some implementations of the first aspect, the method includes: when a first condition is met or a second condition is not met, obtaining the information about the channel with the passive intermodulation source based on the first update direction information p and the first optimization step information $\rho_{opt}$. The first update direction information p and the first optimization step information $\rho_{opt}$ may be the first update direction information p and the first optimization step information $\rho_{opt}$ that are obtained for the first time, or the second update direction information $\tilde{p}$ and the second optimization step information $\tilde{\rho}_{opt}$ that are obtained through iteration are used as the first update direction information p and the first optimization step information $\rho_{opt}$.

In the foregoing implementation, the first update direction information p and the first optimization step information $\rho_{opt}$ may be obtained through iteration, thereby improving accuracy of the first update direction information p and the first optimization step information $\rho_{opt}$, and improving accuracy of the obtained information about the channel.

With reference to the first aspect, in some implementations of the first aspect, the first condition includes one or more of the following content: a quantity of times of obtaining the second update direction information $\tilde{p}$ is greater than or equal to an iteration quantity-of-times threshold; or a modulus length of the second update direction information $\tilde{p}$ is less than a modulus length threshold. The first condition may include a plurality of determining conditions, and may be flexibly combined. That is, it may be determined that the first condition is met when one of the determining conditions is met, or it may be determined that the first condition is met when all the determining conditions are met.

In the foregoing implementation, a quantity of iterations is controlled by using the first condition, so that overheads and energy consumption for obtaining the information about the channel can be controlled.

With reference to the first aspect, in some implementations of the first aspect, the second condition includes one or more of the following content: a quantity of times of obtaining the second update direction information $\tilde{p}$ is less than an iteration quantity-of-times threshold; or a modulus of the second update direction information $\tilde{p}$ is greater than or equal to a modulus length threshold. The second condition may include a plurality of determining conditions, and may be flexibly combined. That is, it may be determined that the second condition is met when one of the determining conditions is met, or it may be determined that the second condition is met when all the determining conditions are met.

In the foregoing implementation, a quantity of iterations is controlled by using the second condition, so that overheads and energy consumption for obtaining the information about the channel can be controlled.

With reference to the first aspect, in some implementations of the first aspect, the method in the foregoing implementations is performed by a network device or a module of a network device, where the quantity $N_x$ of transmit antennas is a quantity of transmit antennas of the network device.

In the foregoing implementation, if the execution body is the network device or the module of the network device, the quantity $N_x$ of transmit antennas is the quantity of transmit antennas of the network device, so as to obtain the information about the channel required by the network device.

With reference to the first aspect, in some implementations of the first aspect, the method in the foregoing implementations is performed by a terminal or a module of a terminal, where the quantity $N_x$ of transmit antennas is a quantity of transmit antennas of the terminal.

In the foregoing implementation, if the execution body is the terminal or the module of the terminal, the quantity $N_x$ of transmit antennas is the quantity of transmit antennas of the terminal, so as to obtain the information about the channel required by the terminal.

A second aspect of an embodiment of the present disclosure provides a communication apparatus. The apparatus provided in the present disclosure has a function of implementing behavior of the base station or the terminal in the foregoing method aspects, and includes a corresponding component (means) configured to perform the steps or the functions described in the foregoing method aspects. The steps or the functions may be implemented by using software, hardware, or a combination of hardware and software.

In an example embodiment, the apparatus includes one or more processors, and may further include an interface circuit. The one or more processors are configured to support the apparatus in performing the functions in the foregoing method. For example, the first update direction information p is obtained based on the first feedback signals $Y_n$, and the information about the channel is obtained based on the first update direction information p. The interface circuit is configured to support the apparatus in communicating with another device, to implement a receiving function and/or a sending function. For example, the first feedback signals $Y_n$ is obtained and/or the first sounding signal $X_n$ is output.

Optionally, the apparatus may further include one or more memories. The memory is configured to be coupled to the processor, and the memory stores program instructions and/or data that are/is necessary for the base station. The one or more memories may be integrated with the processor, or may be disposed independent of the processor. This is not limited in the present disclosure.

The apparatus may be a base station, a next generation base station (gNB), a transmission point (TRP), a distributed unit (DU), a central unit (CU), or the like. The communication unit may be a transceiver or a transceiver circuit. Optionally, the transceiver may alternatively be an input/output circuit or an interface.

The apparatus may be a smart terminal, a wearable device, or the like. The communication unit may be a transceiver or a transceiver circuit. Optionally, the transceiver may alternatively be an input/output circuit or an interface.

The apparatus may alternatively be a chip. The communication unit may be an input/output circuit or an interface of the chip.

In another possible design, the apparatus includes a transceiver, a processor, and a memory. The processor is configured to control the transceiver to send and receive signals, the memory is configured to store a computer program, and the processor is configured to run the computer program in the memory, to enable the apparatus to perform the method in the first aspect.

According to a third aspect, a readable storage medium or a program product is provided, configured to store a program, where the program includes instructions used to perform the method in the first aspect.

According to a fourth aspect, a readable storage medium or a program product is provided, configured to store a program, where when the program is run on a computer, the computer is enabled to execute instructions of the method in the first aspect.

According to a fifth aspect, a system is provided, where the system includes the foregoing base station.

Optionally, the system further includes the foregoing terminal.

It should be understood that the technical solutions of the second aspect to the fifth aspect of the present disclosure correspond to the technical solutions of the first aspect of the present disclosure. Beneficial effects achieved by the aspects and corresponding feasible implementations are similar.

DESCRIPTION OF EMBODIMENTS

The technical solutions in embodiments of the present disclosure may be applied to various communication systems such as a long term evolution (LTE) system, a worldwide interoperability for microwave access (WiMAX) communication system, a 5th generation (5G) system, for example, a new radio access technology (NR) system, a network that integrates a plurality of systems, an internet of things system, an internet of vehicles system, and a future communication system such as a 6G system. The technical solutions in embodiments of the present disclosure may be further applied to device-to-device (D2D) communication, vehicle-to-everything (V2X) communication, machine-to-machine (M2M) communication, machine type communication (MTC), an internet of things (IoT) communication system, or another communication system.

The network architecture and the service scenario described in embodiments of the present disclosure are intended to describe the technical solutions in embodiments of the present disclosure more clearly, but constitute no limitation on the technical solutions provided in embodiments of the present disclosure. A person of ordinary skill in the art may learn that the technical solutions provided in embodiments of the present disclosure are also applicable to a similar technical problem as the network architecture evolves and a new service scenario emerges.

In embodiments of the present disclosure, different base stations may be base stations having different identifiers, or may be base stations that have a same identifier and that are deployed at different geographical locations. In some scenarios, before a base station is deployed, the base station does not know whether the base station is related to a scenario to which embodiments of the present disclosure are applied. The base station or a baseband chip may support the methods provided in embodiments of the present disclosure before being deployed. In some scenarios, the methods provided in embodiments of the present disclosure may alternatively be supported through upgrade or loading after deployment. It may be understood that the foregoing base stations having the different identifiers may be base station identifiers, or may be cell identifiers or other identifiers.

In embodiments of the present disclosure, an NR network scenario in a wireless communication network is used as an example to describe some scenarios. It should be noted that the solutions in embodiments of the present disclosure may further be applied to another wireless communication network, and a corresponding name may also be replaced with a name of a corresponding function in the another wireless communication network.

Figure 1:
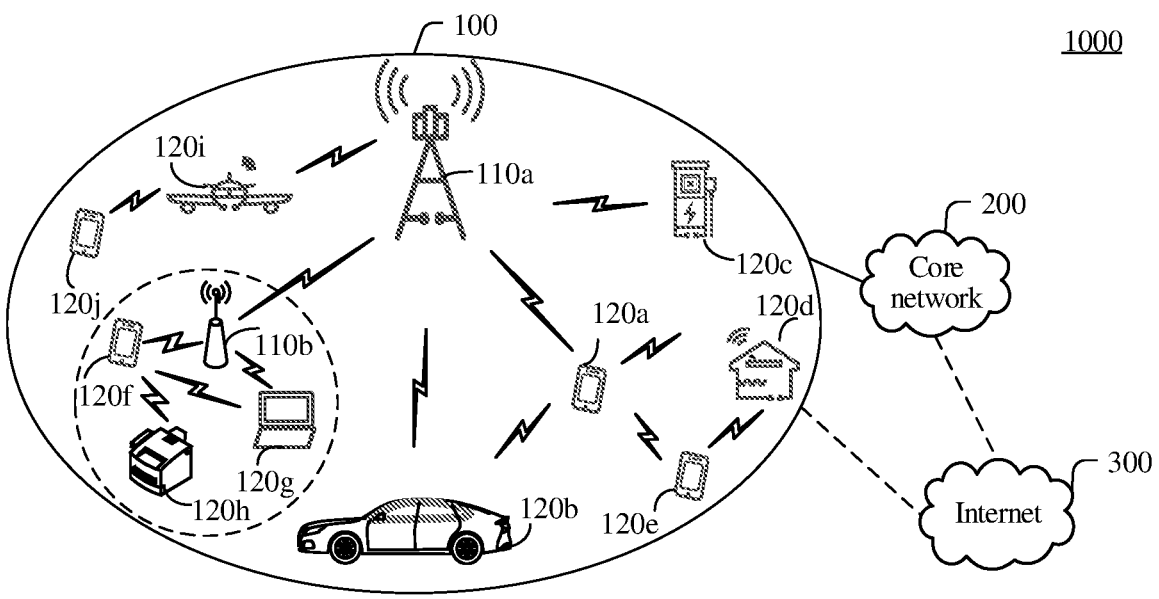
FIG. 1 is a schematic diagram of an architecture of a communication system to which an embodiment of the present disclosure is applied.

For ease of understanding embodiments of the present disclosure, a communication system shown in FIG. 1 is first used as an example to describe in detail a communication system applicable to embodiments of the present disclosure. FIG. 1 is a schematic diagram of an architecture of a communication system 1000 to which an embodiment of the present disclosure is applied. As shown in FIG. 1, the communication system includes a radio access network 100 and a core network 200. Optionally, the communication system 1000 may further include an Internet 300. The radio access network 100 may include at least one radio access network device (for example, 110a and 110b in FIG. 1), and may further include at least one terminal (for example, 120a to 120j in FIG. 1). The terminal is connected to the radio access network device in a wireless manner, and the radio access network device is connected to the core network in a wireless or wired manner. A core network device and the radio access network device may be independent and different physical devices, or functions of the core network device and logical functions of the radio access network device are integrated into a same physical device, or a part of functions of the core network device and a part of functions of the radio access network device are integrated into one physical device. A wired or wireless manner may be used for connection between terminals and between radio access network devices. FIG. 1 is only a schematic diagram. The communication system may further include other network devices, for example, may further include a wireless relay device and a wireless backhaul device, which are not shown in FIG. 1.

The radio access network device may be a base station, an evolved base station (eNodeB), a transmission reception point (TRP), a next generation base station (gNB) in a 5th generation (5G) mobile communication system, a next generation base station in a 6th generation (6G) mobile communication system, a base station in a future mobile communication system, an access node in a Wi-Fi system, or the like; or may be a module or unit that completes some functions of the base station, for example, may be a central unit (CU), or may be a distributed unit (DU). The radio access network device may be a macro base station (for example, 110a in FIG. 1), or may be a micro base station or an indoor station (for example, 110b in FIG. 1), or may be a relay node, a donor node, or the like. It may be understood that all or some functions of the radio access network device in the present disclosure may also be implemented by using a software function running on hardware, or may be implemented by using an instantiated virtualization function on a platform (for example, a cloud platform). A specific technology and a specific device form used by the radio access network device are not limited in this embodiment. For ease of description, the following uses an example in which the base station is used as the radio access network device for description.

Figure 2:
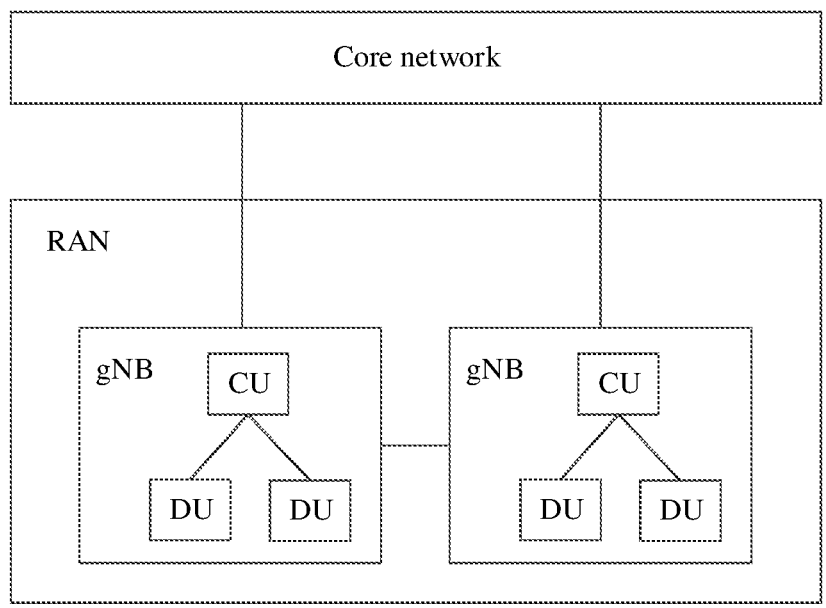
FIG. 2 is a schematic diagram of a network architecture in which a plurality of DUs share one CU according to an embodiment of the present disclosure.
Figure 3:
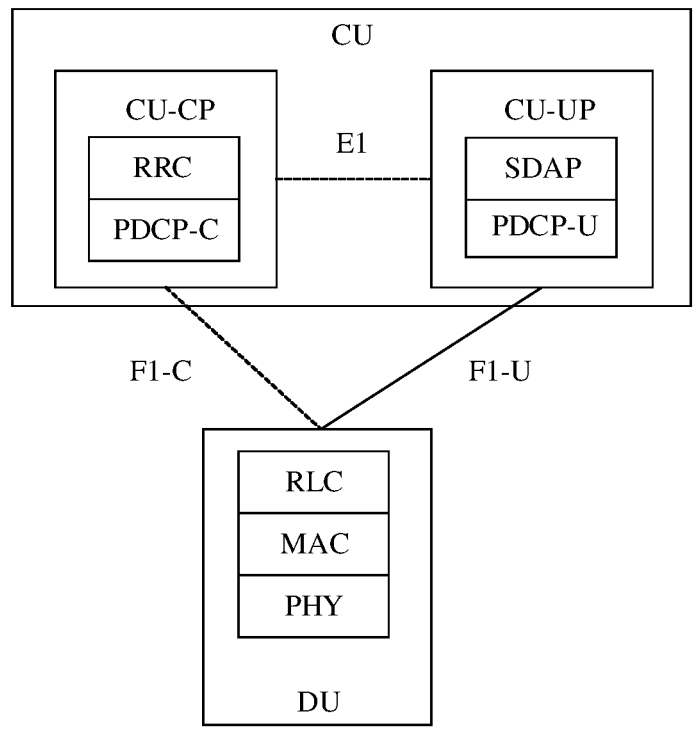
FIG. 3 is a schematic diagram of protocol layer functions of a CU and a DU according to an embodiment of the present disclosure.

In some deployments, the radio access network device (for example, the gNB) may include a CU and a DU. The gNB may further include a radio frequency unit (radio unit, RU). The CU and the DU may be understood as division of the base station from a perspective of logical functions. The CU and the DU may be physically separated or may be deployed together. For example, a plurality of DUs may share one CU, or one DU may be connected to a plurality of CUS, and the CU and the DU may be connected through an F1 interface. For example, FIG. 2 is a schematic diagram of a network architecture in which a plurality of DUs share one CU according to an embodiment of the present disclosure. As shown in FIG. 2, a core network and a RAN are interconnected and communicate with each other, and a base station in the RAN is divided into CUs and DUs, and a plurality of DUs share one CU. The network architecture shown in FIG. 2 may be used in a 5G communication system, or may share one or more components or resources with an LTE system. An access network device including a CU node and a DU node splits a protocol layer. Functions at some protocol layers are centrally controlled in the CU, and functions at remaining or all protocol layers are distributed in the DUs. The CU centrally controls the DUs. In an implementation, as shown in FIG. 3, the CU is deployed with an RRC layer, a PDCP layer, and a service data adaptation protocol (SDAP) layer in a protocol stack; and the DU is deployed with a radio link control (RLC) layer, a medium access control (MAC) layer, and a physical layer (PHY) in the protocol stack. Therefore, the CU is capable of processing the RRC, the PDCP, and the SDAP. The DU is capable of processing the RLC, the MAC, and the PHY. It may be understood that the foregoing function division is merely an example, and does not constitute a limitation on the CU and the DU.

The terminal may also be referred to as a terminal device, user equipment (UE), a mobile station, a mobile terminal, or the like. The terminal may be widely used in various scenarios, for example, device-to-device (D2D), vehicle to everything (V2X) communication, machine type communication (MTC), internet of things (IoT), virtual reality, augmented reality, industrial control, self-driving, telemedicine, smart grid, smart furniture, smart office, smart wearable, smart transportation, and smart city. The terminal may be a mobile phone, a tablet computer, a computer with a wireless transceiver function, a wearable device, a vehicle, an unmanned aerial vehicle, a helicopter, an airplane, a ship, a robot, a mechanical arm, a smart home device, or the like. A specific technology and a specific device form used by the terminal are not limited in this embodiment.

The base station and the terminal may be fixed or movable. The base station and the terminal may be deployed on land, including an indoor or outdoor scenario, and a handheld or an in-vehicle scenario; or may be deployed on water; or may be deployed on an aircraft, a balloon, or a manmade satellite in the air. Application scenarios of the base station and the terminal are not limited in embodiments of the present disclosure.

Roles of the base station and the terminal may be opposite, for example, the helicopter or UAV 120*i* in FIG. 1 may be configured as the mobile base station, and for the terminal 120*j* accessing the radio access network 100 through 120*i*, the terminal 120*i* is the base station. However, for the base station 110*a*, 120*i* is the terminal, that is, communication between 110*a* and 120*i* is performed by using a wireless air interface protocol. Certainly, communication may also be performed between 110*a* and 120*i* by using an interface protocol between base stations. In this case, compared with 110*a*, 120*i* is also the base station. Therefore, both the base station and the terminal may be collectively referred to as a communication apparatus, 110*a* and 110*b* in FIG. 1 may be referred to as a communication apparatus having a base station function, and 120*a* to 120*j* in FIG. 1 may be referred to as a communication apparatus having a terminal function.

Communication between the base station and the terminal, between the base station and the base station, or between the terminal and the terminal may be performed by using a licensed spectrum, or may be performed by using an unlicensed spectrum, or may be performed by using both the licensed spectrum and the unlicensed spectrum. Communication may be performed by using a spectrum below 6 gigahertzes (GHz), or may be performed by using a spectrum above 6 GHz, or may be simultaneously performed by using the spectrum below 6 GHz and the spectrum above 6 GHz. A spectrum resource used for wireless communication is not limited in this embodiment.

In embodiments of the present disclosure, a function of the base station may be performed by a module (such as a chip) in the base station, or may be performed by a control subsystem including a base station function. A control subsystem that includes a base station function herein may be a control center in an application scenario of the foregoing terminal, such as a smart grid, an industrial control, a smart transportation, and a smart city. A function of the terminal may alternatively be performed by a module (for example, a chip or a modem) in the terminal, or may be performed by an apparatus including the function of the terminal.

A nonlinear interference source is an important factor that limits a capacity of a communication system, and a passive inter-modulation source is a typical nonlinear interference source. A method for obtaining information about a channel from a transmit antenna to a passive inter-modulation source mainly includes a codebook-based beam scanning method and a parameter estimation method based on nonlinear interference modeling. The two methods have poor calculation precision and are difficult to calculate. To resolve the foregoing problems, the present disclosure provides a method for obtaining information about a channel, including: obtaining a first feedback signal from a passive inter-modulation source; obtaining first update direction information based on the first feedback signal; and obtaining information about a channel with the passive inter-modulation source based on the first update direction information.

It may be understood that the method for obtaining information about a channel in the present disclosure may be performed by a base station, may be performed by a terminal, or may be performed by a component (for example, a processor, a chip, or a chip system) of a base station, or may be performed by a component (for example, a processor, a chip, or a chip system) of a terminal, or may be implemented by a logical module or software that can implement all or some base station functions. In subsequent embodiments, an example in which a base station is used as an implementation body is used for description.

Figure 4:
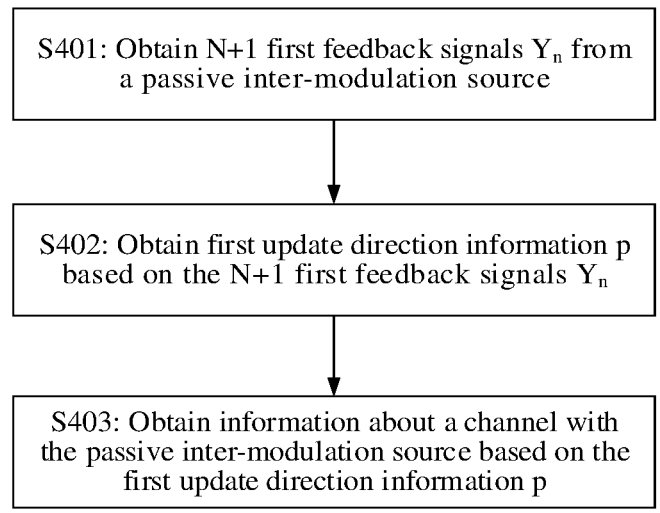
FIG. 4 to FIG. 7 are schematic flowcharts of several methods for obtaining information about a channel according to an embodiment of the present disclosure.

As shown in FIG. 4, the method in this embodiment includes the following steps.

S401: Obtain N+1 first feedback signals $Y_n$ from a passive inter-modulation source.

In a possible implementation, the base station obtains at least N+1 feedback signals from the passive inter-modulation source, and selects N+1 feedback signals as the first feedback signals $Y_n$, where n=0 . . . N, and N is an integer greater than 0.

In a possible implementation, N may be an integer related to a quantity $N_x$ of transmit antennas, where $N_x$ is an integer greater than 0. For example, $N=N_x$, or $N=2N_x$.

S402: Obtain first update direction information p based on the N+1 first feedback signals $Y_n$.

p is a vector whose dimension is related to $N_x$. It may be understood that when N is related to $N_x$, it may also be understood that p is a vector whose dimension is related to N. There are a plurality of different implementations of obtaining the first update direction information p based on the N+1 first feedback signals $Y_n$. For example, the first update direction information p may be obtained based on one or more of the following content of the N+1 first feedback signal $Y_n$:

a power of the signal;
a sum of amplitudes of the signal;
an average amplitude of the signal; or
a sum of some or all feature values of a covariance matrix of the signal.

S403: Obtain information about a channel with the passive inter-modulation source based on the first update direction information p.

The information about the channel between the base station and the passive inter-modulation source is obtained based on the first update direction information p.

In the foregoing implementation, the information about the channel may be obtained by using the feedback signal, thereby improving accuracy of the obtained information about the channel and reducing complexity of obtaining the information about the channel.

Figure 5:
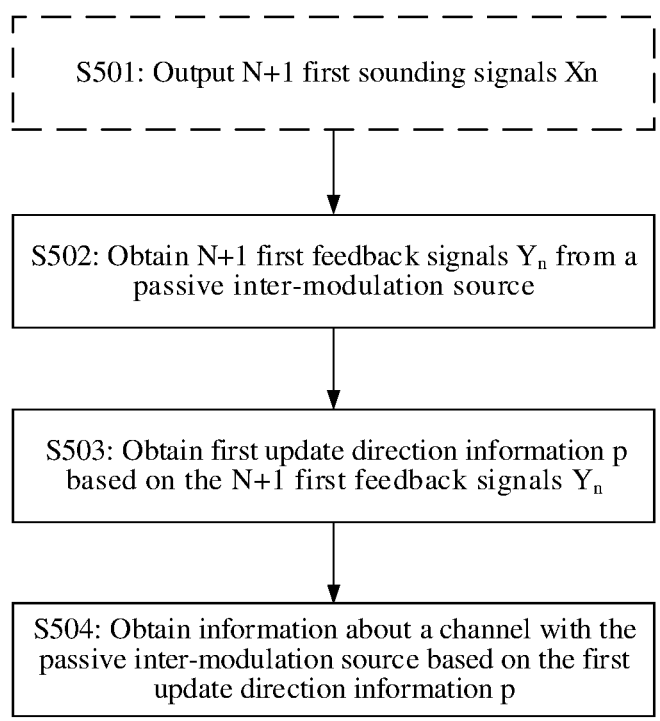

As shown in FIG. 5, the method in this embodiment includes the following steps.

S501: Optionally, output N+1 first sounding signals $X_n$.

In a possible implementation, the base station outputs at least N+1 first sounding signals $X_n$, and sends the at least N+1 first sounding signals through a transmit antenna. For content related to N, refer to the related content in S401.

The first sounding signal $X_n$ is related to a first weight $v_n$, and a dimension of the first weight $v_n$ is related to $N_x$. It may be understood that when N is related to $N_x$, it may also be understood that the dimension of the first weight $v_n$ is related to N. The first weight $v_n$ may be implemented in the following possible implementations.

In a first possible implementation, N is equal to a quantity of transmit antennas of the base station, that is, $N=N_x$. For example, the first weight $v_n$ meets the following:

$$\begin{cases} v_n = a, & n = 0 \\ v_n = a + \Delta \cdot e_n, & 0 < n \le N \end{cases}$$

where a is a vector of $N_x \times 1$, $\Delta$ may be any complex number, $e_n$ is a base vector whose dimension is $N_x \times 1$, and meets $e_n[n]=1$, and when i≠n, $e_n[i]=0$, where i is a positive integer.

In a second possible implementation, N is twice a quantity of transmit antennas, that is, $N=2N_x$. For example, the first weight $v_n$ meets the following:

$$\begin{cases} v_n = a, & n = 0 \\ v_{2n-1} = a + \Delta_1 \cdot e_n, & 0 < n \le N_x \\ v_{2n} = a + \Delta_2 \cdot e_n, & 0 < n \le N_x \end{cases}$$

where $\Delta_1$ is a real number, and $\Delta_2$ is a pure imaginary number. a and $e_n$ are the same as that in the first possible implementation.

In a third possible implementation, N is any integer greater than 0. For example, the first weight $v_n$ meets the following:

$$\begin{cases} v_n = a, & n = 0 \\ v_n = a + \beta \cdot w_n, & 0 < n \le N \end{cases}$$

where a is a vector of $N_x \times 1$, $\beta$ is a correction amount and may be any complex number, and $w_n$ is a complex vector whose dimension is $N_x \times 1$, and may include the following forms:

$w_n$ is a base vector $e_n$ whose dimension is $N_x \times 1$;
$w_n$ is a discrete fourier transform (DFT) weight vector whose dimension is $N_x \times 1$; or
$w_n$ is a random vector of $N_x \times 1$.

The first weight $v_n$ may alternatively be a weight vector obtained by performing basic transformation on $v_n$. For example, modular normalization is performed on the first weight $v_n$ to obtain $$\frac{v_n}{\|v_n\|_2}$$

as the first weight, or direction adjustment is performed to obtain $D \cdot v_n$ as the first weight. For example, when a dimension of $v_n$ is $N_x \times 1$, D is a matrix of $N_x \times N_x$, for example, $D=I-UU^H$, and U is a matrix whose dimension is $N_x \times L$, where L is a positive integer.

The first sounding signal $X_n$ is related to the first weight $v_n$. For example, the first sounding signal meets $X_n = v_n x$, and x is a vector of $1 \times N_{pt}$. If x represents a frequency domain signal, $N_{pt}$ represents a quantity of subcarriers. If x represents a time domain signal, $N_{pt}$ represents a quantity of sampling points. Specific content of x is not limited. For example, x may be a complex random vector whose vector value complies with Gaussian distribution.

S502: Obtain N+1 first feedback signals $Y_n$ from a passive inter-modulation source.

For details, refer to the content in S401.

In a possible implementation, the N+1 first feedback signals $Y_n$ may be excited by the N+1 first sounding signals $X_n$ sent by the base station in S401. In another possible implementation method, the N+1 first feedback signals $Y_n$ may be excited by the first sounding signals $X_n$ sent by another device.

S503: Obtain first update direction information p based on the N+1 first feedback signals $Y_n$.

For details, refer to the content in S402. Specifically, with reference to the implementation in S501, there are the following possible implementations.

For the first possible implementation in S501, the first update direction information p meets $$p[n] = \frac{\Delta}{|\Delta|} \frac{f_1(Y_n) - f_1(Y_0)}{|\Delta|},$$

where |·| indicates that a modulus length is obtained for a complex number.

For the second possible implementation in S501, the first update direction information p meets $$p[n] = \frac{\Delta_1}{|\Delta_1|}\frac{f_1(Y_{2n-1}) - f_1(Y_0)}{|\Delta_1|} + \frac{\Delta_2}{|\Delta_2|}\frac{f_1(Y_{2n}) - f_1(Y_0)}{|\Delta_2|},$$

where |·| indicates that a modulus length is obtained for a complex number.

For the third possible implementation in S501, an index Idx may be obtained based on the first feedback signal, where Idx meets $$Idx = \arg\max_i \{f_1(Y_i), \ i = 0, 1, \ldots, N_x\},$$

and if Idx=0, p=0; and if Idx≠0, $p=\beta \cdot w_{Idx}$. For example, Idx is obtained based on a power of the first feedback signal, where a power of a $Y_1$ signal is the largest, Idx=1, and the update direction information is $p=\beta \cdot w_1$.

In the foregoing implementation, $f_1(\cdot)$ is a signal processing function, an input of the function is the first feedback signal $Y_n$, and an output is a result obtained based on one or more of the following attributes of the first feedback signal:
a power of the signal;
a sum of amplitudes of the signal;
an average of amplitudes of the signal; or
a sum of some or all feature values of a covariance matrix of the signal.

The foregoing implementation may also be understood as obtaining the first update direction information p based on one or more attributes of the first feedback signal $Y_n$.

It may be understood that the first update direction information p may alternatively be a vector obtained by performing basic transformation on the first update direction information p. For example, modular normalization may be performed on p to obtain $$\frac{p}{\|p\|_2}$$

as the first update direction information p.

S504: Obtain information about a channel with the passive inter-modulation source based on the first update direction information p.

For details, refer to the related content in S403.

The information about the channel h from the base station to the passive inter-modulation source may be represented as $h=f_4(a+l_s \cdot p)$, where $l_s$ is a step, and a value of $l_s$ may include one or more of the following content: $l_s$ is a constant, for example, $l_s=1$; $l_s=\|p\|_2$, that is, a modulus length of a vector p; or $l_s$ is a random non-negative number. $f_4(\cdot)$ is a transformation function. For example, a form of $f_4(\cdot)$ may include one of the following content:
performing conjugation, for example, $h=(a+l_s \cdot p)^*$;
performing direction adjustment and conjugation, for example, $h=(D(a+l_s \cdot p))^*$, where for D, refer to the related content in S501; and
performing direction adjustment, conjugation, and normalization, for example, h=

$$h = \left(\frac{D(a + l_s \cdot p)}{\|D(a + l_s \cdot p)\|_2}\right)^*,$$

where for D, refer to the related content in S501.

In the foregoing implementation, the information about the channel may be obtained by using the specified sounding signal and the received feedback signal. The method has an effect of low complexity and high accuracy, can reduce complexity, and reduce power consumption in a process of obtaining the information about the channel.

Figure 6:
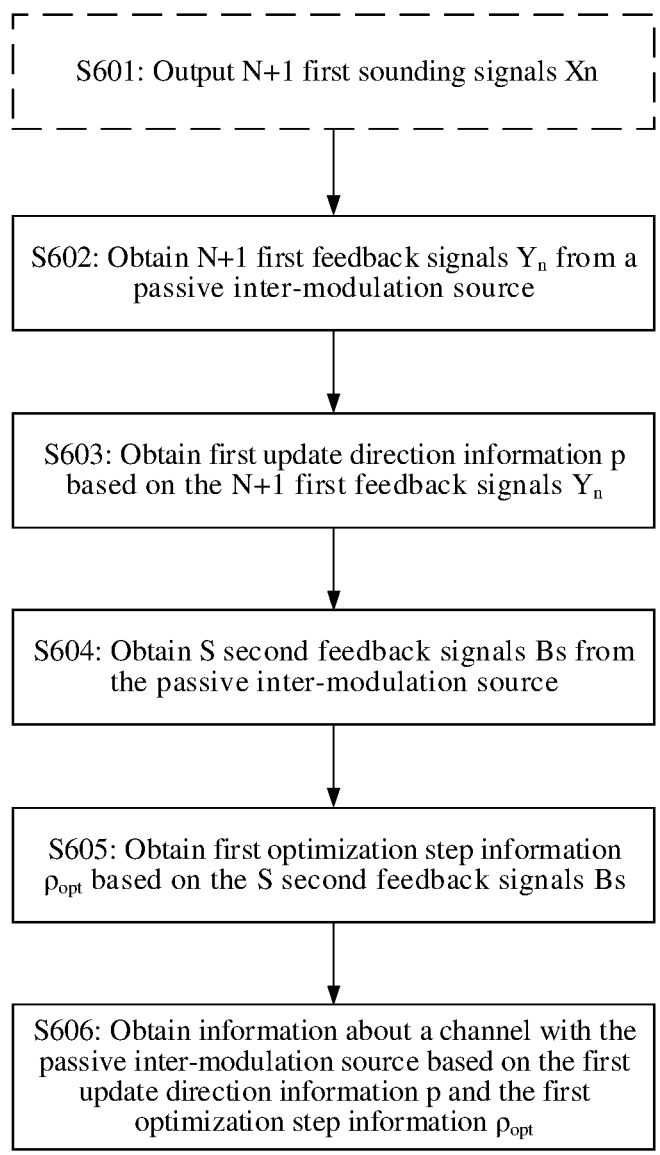

In the foregoing implementation, the information about the channel is obtained by using the update direction information p, and a degree of impact of the update direction information on the information about the channel is adjusted by using a step $l_s$. In a possible implementation, the step $l_s$ may be calculated, so as to improve accuracy of the information about the channel. As shown in FIG. 6, the method includes the following steps.

S601: Optionally, output N+1 first sounding signals $X_n$.
For details, refer to the related content in S501.

S602: Obtain N+1 first feedback signals $Y_n$ from a passive inter-modulation source.
For details, refer to the content in S502.

S603: Obtain first update direction information p based on the N+1 first feedback signals $Y_n$.
For details, refer to the content in S503.

S604: Obtain S second feedback signals $B_s$ from the passive inter-modulation source.

In a possible implementation, the S second feedback signals $B_s$ may be excited by the S second sounding signals $A_s$. The second sounding signal $A_s$ is output by the base station, or is output by another device. This is not limited in the present disclosure. The second sounding signal $A_s$ is generated based on the first update direction information p and a first step value $\rho_s$ corresponding to the second sounding signal $A_s$. S=1 . . . S, and S is an integer greater than 0.

For example, in a possible implementation method, $A_s$ meets:

$$A_s = (a + \rho_s \cdot p) \cdot x$$

where $a+\rho_s \cdot p$ is a weight vector whose dimension is $N_x \times 1$, for a and x, refer to the related content in S502, and for p, refer to the content of p in S503. $\rho_s$ is an $s^{th}$ step value, and the step value $\rho_s$ may be any real number or complex number. This is not limited in the present disclosure.

It may be understood that, for the weight vector $a+\rho_s \cdot p$, basic transformation may be further performed on $a+\rho_s \cdot p$, to obtain a required weight vector. For example, modular normalization $$\frac{a + \rho_s \cdot p}{\|a + \rho_s \cdot p\|_2}$$

is performed on the weight vector, or direction adjustment $D \cdot (a+\rho_s \cdot p)$ is performed on the weight vector. For D, refer to the related content in S501.

S605: Obtain first optimization step information $\rho_{opt}$ based on the S second feedback signals $B_s$.

In a possible implementation, the first optimization step information $\rho_{opt}$ may be obtained based on one or more of the following attributes of the second feedback signal $B_s$:
a power of the signal;
a sum of amplitudes of the signal;
an average value of amplitudes of the signal; or
a sum of all or some feature values of a covariance matrix of the signal.

For example, a step value corresponding to $B_s$ with a maximum power of the signal, a maximum sum of amplitudes of the signal, a maximum average value of amplitudes of the signal, or a maximum sum of all or some feature values of a covariance matrix of the signal may be used as $\rho_{opt}$.

For example, a compensation value $\rho_{opt}$ corresponding to $B_s$ with a maximum power may be obtained based on powers of $B_s$.

S606: Obtain information about a channel with the passive inter-modulation source based on the first update direction information p and the first optimization step information $\rho_{opt}$.

The information about the channel h from the base station to the passive inter-modulation source may be obtained based on the first update direction information p and the first optimization step information $\rho_{opt}$, and may be represented as $h=f_4(a+\rho_{opt}\cdot p)$, where $f_4(\cdot)$ is a transformation function, which may refer to the related content in S504.

According to the foregoing embodiments, the step information is calculated, thereby improving accuracy of the obtained information about the channel.

Figure 7:
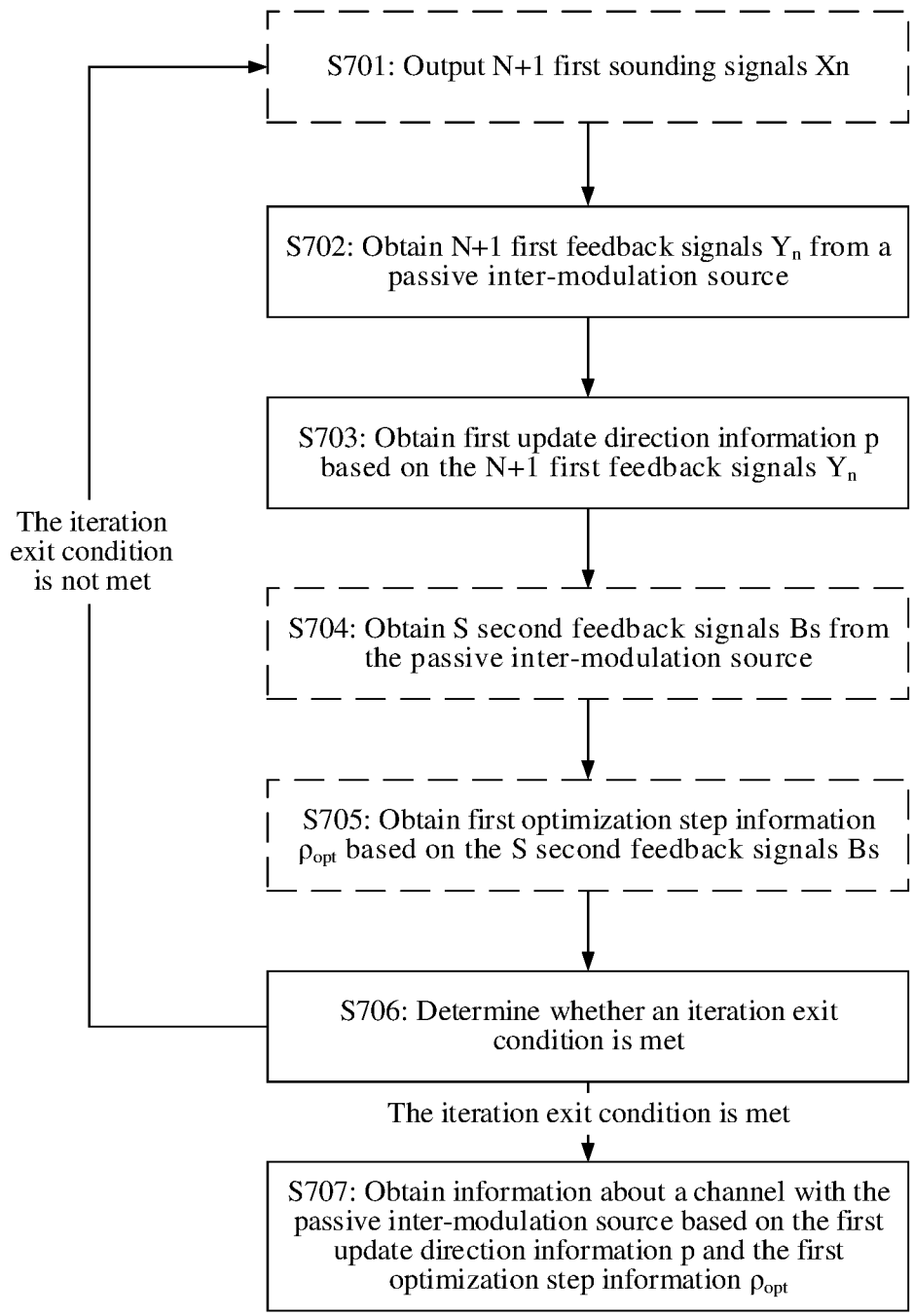

Alternatively, the first update direction information p and/or the first optimization step information $\rho_{opt}$ may be calculated for a plurality of times in an iteration manner, so as to improve accuracy of the obtained information about the channel. In a possible implementation, as shown in FIG. 7, the method includes the following steps.

S701: Optionally, output N+1 first sounding signals $X_n$.

For details, refer to the related content in S501.

S702: Obtain N+1 first feedback signals $Y_n$ from a passive inter-modulation source.

For details, refer to the content in S502. Details are not described again.

S703: Obtain first update direction information p based on the N+1 first feedback signals $Y_n$.

For details, refer to the content in S503. Details are not described again.

S704: Optionally, obtain S second feedback signals $B_s$ from the passive inter-modulation source.

The S second feedback signals $B_s$ obtained from the passive inter-modulation source are used to calculate first optimization step information $\rho_{opt}$. For details, refer to the content in S604. Details are not described again.

S705: Optionally, obtain first optimization step information $\rho_{opt}$ based on the S second feedback signals $B_s$.

The S second feedback signals $B_s$ obtained from the passive inter-modulation source are used to calculate the first optimization step information $\rho_{opt}$. For details, refer to the content in S605. Details are not described again.

S706: Determine whether a first condition is met or that a second condition is not met.

The base station determines whether the first condition is met or that the second condition is not met.

The first condition includes one or more of the following content:
  a quantity of iterations is greater than or equal to an iteration quantity-of-times threshold. For example, a quantity of times of obtaining the first update direction information in S703 may be counted as the quantity of iterations;
  a modulus length $\|p\|_2$ of the first update direction information p is less than a modulus length threshold;
  a first optimization step $\rho_{opt}$ is less than a step threshold;
  one or more of the following attributes of the first feedback signal $Y_n$ are greater than or equal to a corresponding threshold: a power of the signal, a sum of amplitudes of the signal, an average value of amplitudes of the signal, or a sum of all or some feature values of a covariance matrix of the signal; and
  one or more of the following attributes of the second feedback signal $B_s$ are greater than or equal to a corresponding threshold: a power of the signal, a sum of amplitudes of the signal, an average value of amplitudes of the signal, or a sum of all or some feature values of a covariance matrix of the signal.

The second condition includes one or more of the following content:
  a quantity of iterations is less than an iteration quantity-of-times threshold. For example, a quantity of times of obtaining the first update direction information in S703 may be counted as the quantity of iterations;
  a modulus length $\|p\|_2$ of the first update direction information p is greater than or equal to a modulus length threshold;
  a first optimization step $\rho_{opt}$ is greater than or equal to a step threshold;
  one or more of the following attributes of the first feedback signal $Y_n$ are less than the corresponding threshold: a power of the signal, a sum of amplitudes of the signal, an average value of amplitudes of the signal, or a sum of all or some feature values of a covariance matrix of the signal; and
  one or more of the following attributes of the second feedback signal $B_s$ are less than the corresponding threshold: a power of the signal, a sum of amplitudes of the signal, an average value of amplitudes of the signal, or a sum of all or some feature values of a covariance matrix of the signal.

It may be understood that the foregoing determining conditions may be flexibly combined.

In a possible implementation, it may be determined that an iteration condition is met when one of the plurality of determining conditions is met. For example, when the quantity of iterations is greater than or equal to the iteration quantity-of-times threshold, or the modulus length $\|p\|_2$ of the first update direction information p is less than the modulus length threshold, it may be determined that the first condition is met. For another example, when the power of the signal of the first feedback signal $Y_n$ is less than a signal power threshold, or the average value of the amplitudes of the signal of the first feedback signal $Y_n$ is less than an amplitude average threshold, it may be determined that the second condition is met.

In another possible implementation, it can be determined that the iteration condition is met only when the plurality of determining conditions are met simultaneously. For example, when the quantity of iterations is greater than or equal to the iteration quantity-of-times threshold, and the modulus length $\|p\|_2$ of the first update direction information p is less than the modulus length threshold, it may be determined that the first condition is met. For another example, when the power of the signal of the first feedback signal $Y_n$ is less than the signal power threshold, and the average value of the amplitudes of the signal of the first feedback signal $Y_n$ is less than the amplitude average threshold, it may be determined that the second condition is met.

If the first condition is met or the second condition is not met, S707 is performed.

If the first condition is not met or the second condition is met, S701 to S705 are performed again based on the first update direction information p and/or the first optimization step information $\rho_{opt}$ to perform iterative calculation. The first possible implementation in S501 is used as an example, and includes the following content.

Optionally, a third sounding signal $\tilde{X}_m$ is sent, where m=0 ... M, M is an integer greater than 0, and M may be the same as or different from N. The third sounding signal $\tilde{X}_m$ is related to a second weight $\tilde{v}_m$, and the second weight $\tilde{v}_m$ may be obtained by updating the first weight $v_n$ based on the first update direction information p and/or the first optimization step information $\rho_{opt}$. For example, details are as follows:

$$\begin{cases} \tilde{v}_m = a + l_s \cdot p, & m = 0 \\ \tilde{v}_m = a + l_s \cdot p + \Delta \cdot e_m, & 0 < m < M \end{cases}; \text{or}$$

$$\begin{cases} \tilde{v}_m = a + \rho_{opt} \cdot p, & m = 0 \\ \tilde{v}_m = a + \rho_{opt} \cdot p + \Delta \cdot e_m, & 0 < m < M \end{cases}$$

where for a, $l_s$, and $\Delta$, refer to the related content in S501 to S504, and a, $l_s$, and $\Delta$ remain unchanged or change in an iteration process, for example, may be adjusted based on a calculation result.

M+1 third feedback signals $\tilde{Y}_m$ are obtained from the passive inter-modulation source, where the third feedback signals $\tilde{Y}_m$ are excited by the third sounding signals $\tilde{Y}_m$. Second update direction information $\tilde{p}$ is obtained based on the M+1 third feedback signals $Y_m$. For details, refer to the content in S503. Details are not described again.

Optionally, K fourth feedback signals $\tilde{B}_k$ are obtained from the passive inter-modulation source, where k=1 ... K, and K is an integer greater than 0. The K fourth feedback signals $\tilde{B}_k$ are excited by the K fourth sounding signals $\tilde{A}_k$. For details, refer to the content in S604. Details are not described again.

Optionally, second optimization step information $\tilde{\rho}_{opt}$ is obtained based on the K fourth feedback signals $\tilde{B}_k$. For details, refer to the content in S605. Details are not described again.

It may be understood that the second update direction information $\tilde{p}$ may be used as the first update direction information p after iteration, and the second optimization step information $\tilde{\rho}_{opt}$ may be used as the first optimization step information $\rho_{opt}$ after iteration, and is used to perform next iterative calculation.

S707: Obtain information about a channel with the passive inter-modulation source based on the first update direction information p and/or the first optimization step information $\rho_{opt}$.

After an iteration exit condition is met, the information about the channel between the base station and the passive inter-modulation source is calculated based on the first update direction information p and/or the first optimization step information $\rho_{opt}$. For details, refer to the related content in S504 or S606. It may be understood that the first update direction information p and the first optimization step information $\rho_{opt}$ herein may be the first update direction information p and the first optimization step information $\rho_{opt}$ that are obtained during the first calculation, or may be the second update direction information $\tilde{p}$ and the second optimization step information $\tilde{\rho}_{opt}$ that are obtained during the last iteration.

According to the foregoing embodiment, a calculated deviation may be controlled through iteration, so as to improve calculation precision.

It may be understood that an "embodiment" mentioned in this specification means that particular features, structures, or characteristics related to the embodiment are included in at least one embodiment of the present disclosure. Therefore, embodiments in the specification may not necessarily refer to a same embodiment. In addition, these particular features, structures, or characteristics may be combined in one or more embodiments in any appropriate manner.

It may be understood that to implement functions in the foregoing embodiments, the base station and the terminal include corresponding hardware structures and/or software modules for performing various functions. A person skilled in the art should be easily aware that, based on the units and the method steps in the examples described in embodiments disclosed in the present disclosure, the present disclosure can be implemented through hardware or a combination of hardware and computer software. Whether a function is executed through hardware or hardware driven by computer software depends on particular application scenarios and design constraint conditions of the technical solutions.

Figure 8:
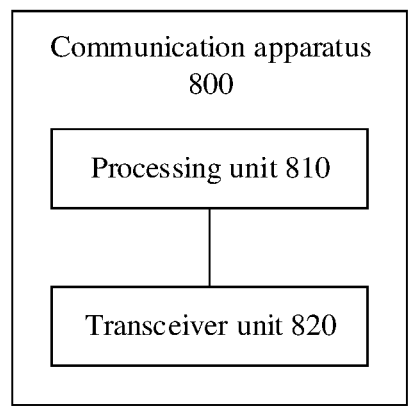
FIG. 8 and FIG. 9 are schematic diagrams of structures of two communication apparatuses according to an embodiment of the present disclosure.
Figure 9:
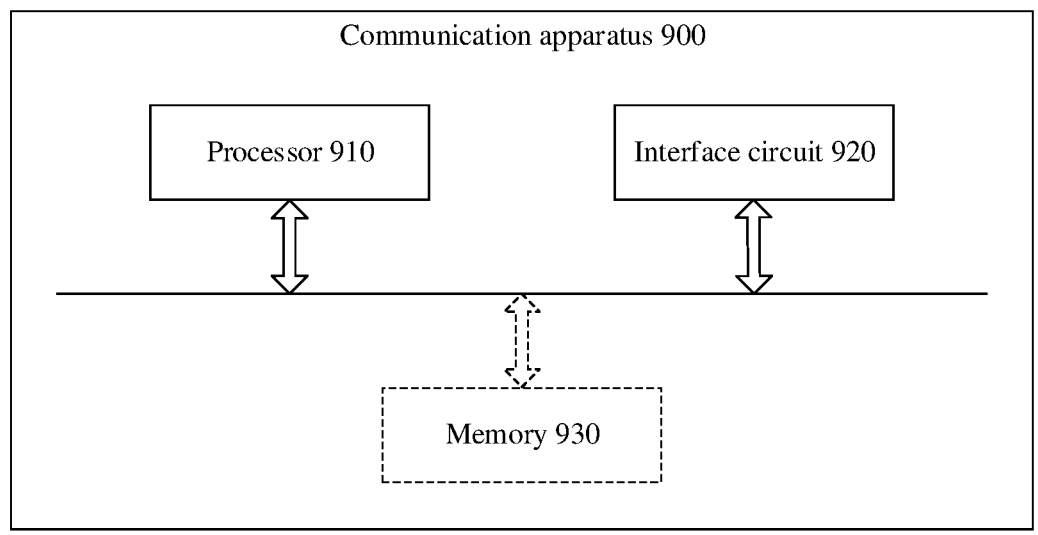

FIG. 8 and FIG. 9 are schematic diagrams of structures of possible communication apparatuses according to an embodiment of the present disclosure. These communication apparatuses may be configured to implement the function of the terminal or the base station in the foregoing method embodiments, and therefore can also achieve beneficial effects of the foregoing method embodiments. In this embodiment, the communication apparatuses may be the terminals 120a to 120j shown in FIG. 1, or may be the base stations 110a and 110b shown in FIG. 1, or may be a module (for example, a chip) used in the terminal or the base station.

As shown in FIG. 8, the communication apparatus 800 includes a processing unit 810 and a transceiver unit 820. The communication apparatus 800 is configured to implement the function of the terminal or the base station in the method embodiments shown in FIG. 4 to FIG. 7.

When the communication apparatus 800 is configured to implement the function in the method embodiment shown in FIG. 7, the transceiver unit 820 is configured to receive a first feedback signal $Y_n$, a second feedback signal $B_s$, a third feedback signal $\tilde{Y}_m$n, or a fourth feedback signal $\tilde{B}_k$, and optionally, may be further configured to send a first sounding signal $X_n$, a second sounding signal $A_s$, a third sounding signal $\tilde{X}_m$, or a fourth sounding signal $\tilde{A}_k$; and the processing unit 810 is configured to obtain first update direction information p, first optimization step information $\rho_{opt}$, second update direction information $\tilde{p}$, second optimization step information $\tilde{\rho}_{opt}$, and information about a channel.

For more detailed descriptions of the processing unit 810 and the transceiver unit 820, directly refer to the related descriptions in the method embodiment shown in FIG. 7. Details are not described herein.

As shown in FIG. 9, the communication apparatus 900 includes a processor 910 and an interface circuit 920. The processor 910 and the interface circuit 920 are coupled to each other. It may be understood that the interface circuit 920 may be a transceiver or an input/output interface. Optionally, the communication apparatus 900 may further include a memory 930, configured to store instructions executed by the processor 910, or store input data required by the processor 910 to run instructions, or store data generated after the processor 910 runs instructions.

When the communication apparatus 900 is configured to implement the method shown in FIG. 7, the processor 910 is configured to perform a function of the processing unit 810, and the interface circuit 920 is configured to perform a function of the transceiver unit 820.

When the communication apparatus is a chip used in a terminal device, the chip in the terminal device implements functions of the terminal device in the foregoing method embodiments. The terminal device chip receives information from another module (for example, a radio frequency module or an antenna) in the terminal device, where the information is sent by the network device to the terminal device. Alternatively, the terminal device chip sends information to another module (for example, a radio frequency module or an antenna) in the terminal device, where the information is sent by the terminal device to the network device.

When the communication apparatus is a chip used in a network device, the chip in the network device implements functions of the network device in the foregoing method embodiments. The network device chip receives information from another module (for example, a radio frequency module or an antenna) in the network device, where the information is sent by the terminal device to the network device. Alternatively, the network device chip sends information to another module (for example, a radio frequency module or an antenna) in the network device, where the information is sent by the network device to the terminal device.

It may be understood that, the processor in embodiments of the present disclosure may be a central processing unit (CPU), or may be another general purpose processor, a digital signal processor (DSP), an application specific integrated circuit (ASIC), a field programmable gate array (FPGA) or another programmable logic device, a transistor logic device, a hardware component, or any combination thereof. The general purpose processor may be a microprocessor, or may be any commonly used processor.

The method steps in embodiments of the present disclosure may be implemented in a hardware manner or may be implemented in a manner of executing a software instruction by a processor. The software instruction may be formed by a corresponding software module. The software module may be stored in a random access memory, a flash memory, a read-only memory, a programmable read-only memory, an erasable programmable read-only memory, an electrically erasable programmable read-only memory, a register, a hard disk, a removable hard disk, a CD-ROM, or any other form of storage medium well-known in the art. For example, a storage medium is coupled to a processor, so that the processor can read information from the storage medium or write information into the storage medium. Certainly, the storage medium may be a component of the processor. The processor and the storage medium may be located in an ASIC. In addition, the ASIC may be located in a network device or a terminal device. Certainly, the processor and the storage medium may exist in the network device or the terminal device as discrete components.

All or a part of the foregoing embodiments may be implemented by software, hardware, firmware, or any combination thereof. When software is used to implement embodiments, all or a part of embodiments may be implemented in a form of a computer program product. The computer program product includes one or more computer programs and instructions. When the computer programs or instructions are loaded and executed on a computer, all or some of the procedures or functions in embodiments of the present disclosure are executed. The computer may be a general-purpose computer, a dedicated computer, a computer network, a network device, user equipment, or another programmable apparatus. The computer program or instruction may be stored in a computer readable storage medium, or may be transmitted from one computer-readable storage medium to another computer-readable storage medium. For example, the computer program or instruction may be transmitted from one website, computer, server, or data center to another website, computer, server, or data center in a wired or wireless manner. The computer-readable storage medium may be any usable medium accessible by a computer, or a data storage device, such as a server or a data center, integrating one or more usable media. The usable medium may be a magnetic medium, for example, a floppy disk, a hard disk, or a magnetic tape; or may be an optical medium, for example, a digital video disc; or may be a semiconductor medium, for example, a solid state disk.

In embodiments of the present disclosure, unless otherwise stated or there is a logic conflict, terms and/or descriptions in different embodiments are consistent and may be mutually referenced, and technical features in different embodiments may be combined based on an internal logical relationship thereof, to form a new embodiment.

In the present disclosure, at least one means one or more, and a plurality of means two or more. "And/Or" is an association relationship for describing associated objects, and indicates that three relationships may exist. For example, A and/or B may indicate the following cases: Only A exists, both A and B exist, and only B exists, where A and B may be in a singular form or a plural form. In the text description of the present disclosure, the character "/" generally indicates that the associated objects are in an "or" relationship. In the formula of the present disclosure, the character "/" indicates that the associated objects are in a "division" relationship.

It may be understood that numerical symbols involved in embodiments of the present disclosure are differentiated merely for ease of description, but are not used to limit the scope of embodiments of the present disclosure. It should be understood that sequence numbers of the foregoing processes do not indicate an execution sequence. The execution sequence of the processes should be determined based on functions and internal logic of the processes.

What is claimed is:

1. A method for obtaining channel information, the method comprising:
    obtaining N+1 first feedback signals $Y_n$ from a passive inter-modulation source, wherein n=0 . . . N, N is an integer related to a quantity $N_x$ of transmit antennas or is any positive integer, and $N_x$ is a positive integer;
    obtaining first update direction information p based on the N+1 first feedback signals $Y_n$, wherein the first update direction information p is a vector with a dimension related to $N_x$; and
    obtaining information regarding a channel with the passive inter-modulation source based on the first update direction information p, wherein a beam weight is set utilizing the information regarding the channel.

2. The method according to claim 1, further comprising:
    outputting N+1 first sounding signals $X_n$,
    wherein n=0 . . . N, each of the first sounding signals $X_n$ is related to a first weight $v_n$, and the first weight $v_n$ is a vector with a dimension related to $N_x$; and
    wherein the N+1 first feedback signals $Y_n$ are excited by the N+1 first sounding signals $X_n$.

3. The method according to claim 1, wherein the obtaining first update direction information p based on the first feedback signals $Y_n$ comprises:
    obtaining the first update direction information p based on one or more of the following attributes of the respective first feedback signal $Y_n$:
    a power of the respective first feedback signal $Y_n$;
    a sum of amplitudes of the respective feedback signal $Y_n$;
    an average value of amplitudes of the respective first feedback signal $Y_n$; or
    a sum of some or all feature values of a covariance matrix of the respective first feedback signal $Y_n$.

4. The method according to claim 1, further comprising:
obtaining S second feedback signals $B_s$ from the passive inter-modulation source, wherein s=1 . . . S, and S is an integer greater than 0; and
obtaining first optimization step information $\rho_{opt}$ based on the S second feedback signals $B_s$, wherein
the obtaining of information regarding the channel with the passive inter-modulation source based on the first update direction information p comprises:
obtaining the information regarding the channel with the passive inter-modulation source based on the first update direction information p and the first optimization step information $\rho_{opt}$.

5. The method according to claim 4, further comprising:
outputting S second sounding signals $A_s$, wherein s=1 . . . S, each of the second sounding signals $A_s$ is generated based on the first update direction information p and a first step value $\rho_s$ corresponding to the respective second sounding signal $A_s$, and $\rho_s$ is a real number or a complex number, wherein
the S second feedback signals $B_s$ are excited by the S second sounding signals $A_s$.

6. The method according to claim 4, wherein the obtaining first optimization step information $\rho_{opt}$ based on the S second feedback signals $B_s$ comprises:
obtaining the first optimization step information $\rho_{opt}$ based on one or more of the following attributes of the respective second feedback signal $B_s$:
a power of the respective second feedback signal $B_s$;
a sum of amplitudes of the respective second feedback signal $B_s$;
an average value of amplitudes of the respective second feedback signal $B_s$; or
a sum of all or some feature values of a covariance matrix of the respective second feedback signal $B_s$.

7. The method according to claim 1, further comprising:
when a first condition is not met or a second condition is met,
obtaining M+1 third feedback signals $\tilde{Y}_m$ from the passive inter-modulation source, wherein m=0 . . . M, and M is an integer related to $N_x$ or is any positive integer; and
obtaining second update direction information $\tilde{p}$ based on the M+1 third feedback signals $\tilde{Y}_m$, wherein the second update direction information $\tilde{p}$ is a vector with a dimension related to $N_x$.

8. The method according to claim 7, further comprising:
outputting M+1 third sounding signals $\tilde{X}_m$, wherein m=0 . . . M, the each of the third sounding signals $\tilde{X}_m$ is related to a second weight $\tilde{v}_m$, the second weight $\tilde{v}_m$ is related to the first update direction information p, and the second weight $\tilde{v}_m$ is a vector with a dimension related to $N_x$, wherein
the M+1 third feedback signals $\tilde{Y}_m$ are excited by the M+1 third sounding signals $\tilde{X}_m$.

9. The method according to claim 7, wherein the obtaining second update direction information $\tilde{p}$ based on the third feedback signals $\tilde{Y}_m$ comprises:
obtaining the second update direction information $\tilde{p}$ based on one or more of the following attributes of the respective third feedback signal $\tilde{Y}_m$:
a power of the respective third feedback signal $\tilde{Y}_m$;
a sum of amplitudes of the respective third feedback signal $\tilde{Y}_m$;
an average value of amplitudes of the respective third feedback signal $\tilde{Y}_m$; or
a sum of all or some feature values of a covariance matrix of the respective third feedback signal $\tilde{Y}_m$.

10. The method according to claim 1, further comprising:
when a first condition is met or a second condition is not met,
obtaining the information regarding the channel with the passive inter-modulation source based on the first update direction information p.

11. An apparatus for obtaining channel information, the apparatus comprising:
at least one processor; and
a memory coupled to the at least one processor and configured to store executable instructions that, when executed by the at least one processor, cause the apparatus to:
obtain N+1 first feedback signals $Y_n$ from a passive inter-modulation source, wherein n=0 . . . N, N is an integer related to a quantity $N_x$ of transmit antennas or is any positive integer, and $N_x$ is a positive integer;
obtain first update direction information p based on the N+1 first feedback signals $Y_n$, wherein the first update direction information p is a vector with a dimension related to $N_x$; and
obtain information regarding a channel with the passive inter-modulation source based on the first update direction information p, wherein a beam weight is set utilizing the information regarding the channel.

12. The apparatus according to claim 11, wherein the executable instructions, when executed by the at least one processor, further cause the apparatus to:
output N+1 first sounding signals $X_n$, wherein n=0 . . . N, each of the first sounding signals $X_n$ is related to a first weight $v_n$, and the first weight $v_n$ is a vector with a dimension related to $N_x$, wherein
the N+1 first feedback signals $Y_n$ are excited by the N+1 first sounding signals $X_n$.

13. The apparatus according to claim 11, wherein the executable instructions, when executed by the at least one processor, further cause the apparatus to:
obtain the first update direction information p based on one or more of the following attributes of the respective first feedback signal $Y_n$:
a power of the respective first feedback signal $Y_n$;
a sum of amplitudes of the respective first feedback signal $Y_n$;
an average value of amplitudes of the respective first feedback signal $Y_n$; or
a sum of some or all feature values of a covariance matrix of the respective first feedback signal $Y_n$.

14. The apparatus according to claim 11, wherein the executable instructions, when executed by the at least one processor, further cause the apparatus to:
obtain S second feedback signals $B_s$ from the passive inter-modulation source, wherein s=1 . . . S, and S is an integer greater than 0; and
obtain first optimization step information $\rho_{opt}$ based on the S second feedback signals $B_s$, wherein
the obtaining of information regarding the channel with the passive inter-modulation source based on the first update direction information p comprises:
obtaining the information regarding the channel with the passive inter-modulation source based on the first update direction information p and the first optimization step information $\rho_{opt}$.

15. The apparatus according to claim 14, wherein the executable instructions, when executed by the at least one processor, further cause the apparatus to:
output S second sounding signals $A_s$, wherein s=1 . . . S, each of the second sounding signals $A_s$ is generated based on the first update direction information p and a first step value $\rho_s$ corresponding to the respective second sounding signal $A_s$, and $\rho_s$ is a real number or a complex number, wherein the S second feedback signals $B_s$ are excited by the S second sounding signals $A_s$.

16. The apparatus according to claim 14, wherein the executable instructions, when executed by the at least one processor, further cause the apparatus to:
obtain the first optimization step information $\rho_{opt}$ based on one or more of the following attributes of the respective second feedback signal $B_s$:
a power of the respective second feedback signal $B_s$;
a sum of amplitudes of the respective second feedback signal $B_s$;
an average value of amplitudes of the respective second feedback signal $B_s$; or
a sum of all or some feature values of a covariance matrix of the respective second feedback signal $B_s$.

17. The apparatus according to claim 11, wherein the executable instructions, when executed by the at least one processor, further cause the apparatus to:
when a first condition is not met or a second condition is met,
obtain M+1 third feedback signals $\tilde{Y}_m$ from the passive inter-modulation source, wherein m=0 ... M, and M is an integer related to $N_x$ or is any positive integer; and
obtain second update direction information $\tilde{p}$ based on the M+1 third feedback signals $\tilde{Y}_m$, wherein the second update direction information $\tilde{p}$ is a vector with a dimension related to $N_x$.

18. The apparatus according to claim 17, wherein the executable instructions, when executed by the at least one processor, further cause the apparatus to:
output M+1 third sounding signals $\tilde{X}_m$, wherein each of the third sounding signals $\tilde{X}_m$ is related to a second weight $\tilde{v}_m$, the second weight $\tilde{v}_m$ is related to the first update direction information p, and the second weight $\tilde{v}_m$ is a vector with a dimension related to $N_x$, wherein the M+1 third feedback signals $\tilde{Y}_m$ are excited by the M+1 third sounding signals $\tilde{X}_m$.

19. The apparatus according to claim 17, wherein the executable instructions, when executed by the at least one processor, further cause the apparatus to:
obtain the second update direction information $\tilde{p}$ based on one or more of the following attributes of the respective third feedback signal $\tilde{Y}_m$:
a power of the respective third feedback signal $\tilde{Y}_m$;
a sum of amplitudes of the respective third feedback signal $\tilde{Y}_m$;
an average value of amplitudes of the respective third feedback signal $\tilde{Y}_m$; or
a sum of all or some feature values of a covariance matrix of the respective third feedback signal $\tilde{Y}_m$.

20. The apparatus according to claim 11, wherein the executable instructions, when executed by the at least one processor, further cause the apparatus to:
when a first condition is met or a second condition is not met,
obtain the information regarding the channel with the passive inter-modulation source based on the first update direction information p.

* * * * *